United States Patent
Yang et al.

(10) Patent No.: US 6,843,406 B2
(45) Date of Patent: Jan. 18, 2005

(54) GAS-TIGHT METAL/CERAMIC OR METAL/METAL SEALS FOR APPLICATIONS IN HIGH TEMPERATURE ELECTROCHEMICAL DEVICES AND METHOD OF MAKING

(75) Inventors: Zhenguo Yang, Richland, WA (US); Christopher Andrew Coyle, Pasco, WA (US); Suresh Baskaran, Kennewick, WA (US); Lawrence Andrew Chick, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/260,630

(22) Filed: Sep. 27, 2002

(65) Prior Publication Data

US 2004/0060967 A1 Apr. 1, 2004

(51) Int. Cl.[7] .............................. B23K 31/02; B23K 1/19
(52) U.S. Cl. .................................................. 228/122.1
(58) Field of Search .......................... 228/122.1, 123.1, 228/124.1, 124.5, 124.6, 245–262

(56) References Cited

U.S. PATENT DOCUMENTS

| | | | | |
|---|---|---|---|---|
| 3,862,488 A | * | 1/1975 | Pessell et al. | 228/208 |
| 3,873,944 A | * | 3/1975 | Vaguine et al. | 333/1.1 |
| 4,109,031 A | * | 8/1978 | Marscher | 427/191 |
| 4,763,828 A | * | 8/1988 | Fukaya et al. | 228/124.1 |
| 4,774,154 A | | 9/1988 | Singelyn et al. | |
| 4,801,067 A | * | 1/1989 | Kondo et al. | 228/123.1 |
| 4,978,052 A | * | 12/1990 | Fister et al. | 228/123.1 |
| 5,110,691 A | | 5/1992 | Krasij et al. | |
| 5,330,088 A | * | 7/1994 | Whitlow et al. | 228/179.1 |
| 5,366,136 A | * | 11/1994 | Pagnon | 228/119 |
| 5,427,302 A | * | 6/1995 | Horino et al. | 228/122.1 |
| 5,453,331 A | | 9/1995 | Bloom et al. | |
| 5,776,620 A | * | 7/1998 | Josso et al. | 428/610 |
| 5,807,626 A | * | 9/1998 | Naba | 428/210 |
| 5,942,348 A | | 8/1999 | Jansing et al. | |
| 6,096,181 A | | 8/2000 | Friese et al. | |
| 6,131,797 A | * | 10/2000 | Gasdaska et al. | 228/122.1 |
| 6,271,158 B1 | | 8/2001 | Xue et al. | |
| 6,410,161 B1 | * | 6/2002 | Li | 428/621 |
| 6,430,966 B1 | | 8/2002 | Meinhardt et al. | |
| 6,434,946 B1 | * | 8/2002 | Shaw et al. | 60/752 |
| 6,599,645 B2 | * | 7/2003 | Wittebrood | 428/654 |
| 6,637,643 B2 | * | 10/2003 | Hasz et al. | 228/119 |
| 2002/0102431 A1 | * | 8/2002 | Wittebrood et al. | 428/658 |

FOREIGN PATENT DOCUMENTS

JP              54112357 A    *   9/1979

* cited by examiner

Primary Examiner—Kiley S. Stoner
Assistant Examiner—Kevin McHenry
(74) Attorney, Agent, or Firm—Douglas E. McKinley, Jr.

(57) ABSTRACT

A method of joining metal and metal, or metal and ceramic parts, wherein a first metal part is selected and then processed to form a bond coat that will effectively bond to a sealing material which in turn bonds to a second metal or ceramic part without degrading under the operating conditions of electrochemical devices. Preferred first metal parts include alumina forming alloys from the group consisting of ferritic stainless steels (such as Fecralloys), austinetic stainless steels, and superalloys, and chromia forming alloys formed of ferritic stainless steels. In the case of chromia forming ferritic stainless steels, this bond coat consists of a thin layer of alumina formed on the surface, with a diffusion layer between the first metal part and this thin layer. The bond coat provides a good bonding surface for a sealing layer of glass, braze or combinations thereof, while at the same time the diffusion layer provides a durable bond between the thin alumina layer and the first metal part. In the case of alumina forming alloys, the bond coat consists of cauliflower-like growths of an aluminum oxide nodules embedded in the surface of the alumina forming alloys.

11 Claims, 9 Drawing Sheets

Microstructure of a metal-metal seals. (a) SEM image of metal-metal glass sealing interface. (b) Enlarged microstructure of area A in (a).

Figure 1. A SEM image and EDX analysis of a cross-section of the FeAl diffusion coat, applied by a spray diffusion coating process.

(a)

(a)

Fig 2. Microstructure of a metal-metal seals. (a) SEM image of meta-metal glass sealing interface; (b) Enlarged microstructure of area A in (a).

Fig 3. A graph showing the results of Pop-Gun test designed to measure the interfacial bonding strength of metal/metal and metal/YSZ seals.

(a)

(b)

Fig 4. SEM images of the cross-section of a coated SS430/18/YSZ seal after thermo-cycling and subsequent Pop-Gun test.

Fig 5. The leaking rate of helium was recorded from the 14th cycle.

Fig 6. Results of Thermo-Cycle Leaking Tests

(a)

(b)

Figure 7. SEM images of "cauliflower"-like nodules on the surface of pre-treated Fecralloy (22%Cr, 4.5% Al, 0.1% Y) sheet in a 12 mil thickness, (a) a top-view and (b) a cross-section. The alloy was heat-treated at 1050°C for 4 hours in 2.78% $H_2$+Ar.

Fig 8. Results of the peel tests, an engineering test used to evaluate the bonding strength of sealing interfaces.

(a)

(b)

Figure 9. Fracture surfaces of peel-tested samples showing the pull-out of cauliflower-like nodule and ductile fracture mode: (a) an SEM image of a pin-hole generated during the test; (b) an enlarge of the area A in (a).

GAS-TIGHT METAL/CERAMIC OR METAL/METAL SEALS FOR APPLICATIONS IN HIGH TEMPERATURE ELECTROCHEMICAL DEVICES AND METHOD OF MAKING

CROSS-REFERENCE TO RELATED APPLICATIONS

Not Applicable

BACKGROUND OF THE INVENTION

In many high temperature electrochemical devices, metal and/or ceramic components are often required to be hermetically sealed each other. Development of effective seals has been one of the most critical areas of study for improving the performance of such devices.

For example, solid oxide fuel cells (SOFCs) typically have metallic interconnect components and ceramic cells, commonly referred to as PEN (positive cathode-electrolyte-negative anode). Similar interconnects also exist in a wide variety of other electrochemical devices, such as oxygen generators, and, as in SOCFs, they may simultaneously provide one or more functions. For example, they may act as a separator plate, separating gasses such as the fuel in the anode side and oxidant (air) at the cathode side in a SOFC stack; they may act as an interconnect plate, electrically connecting cells in series in the stack, and/or they may act as mechanical support, supporting the cells and stack for structure integrity.

Interconnect components have been made of heat resistant alloys, including Ni—/Fe-base superalloys, Cr-base alloys and stainless steels. When considering the thermal expansion match with ceramic cells or PEN, ferritic stainless compositions appear to offer the best choice, at least in the rigid seal design. In a SOFC stack, these interconnect components have to be joined and hermetically sealed to ceramic electrolyte YSZ on the components have to be joined and hermetically sealed to ceramic electrolyte YSZ on the PEN, and to another piece of interconnect. For electrochemical devices such as SOFC stacks to perform well, the metal-metal and metal-ceramic seals have to demonstrate good chemical, mechanical and thermomechanical stability. It has been found however, that due to weak bonding between glass and metal or between the metal and the oxide scale that forms on many heat resistant alloys, particularly the conventional ferritic stainless steels, it is often difficult to establish an effective bond and seal between a metal interconnect and a YSZ electrolyte. These difficulties also exist between metal interconnects, as between a sealing glass or braze in SOFC environments.

Depending on the alloy composition, either chromia (if $Cr_2O_3$ is the major component) or alumina (if $Al_2O_3$ is the major component) scales are typically formed on the alloy surface. An alumina scale usually provides better protection of matrix alloy than chromia scale. Due to its electrically insulating nature however, the alumina forming alloys can only be used in the interconnect component where the alumina scale can be bypassed by electrical current. Otherwise the pieces or parts of interconnect have to be made from chromia forming heat resistant alloys. The chromia formed on the alloy surface may not provide satisfactory resistance to oxidation however, particularly for corrosion resistance at a temperature range of 700–850° C., typical in many electrochemical devices. Making the problem worse, the chromia is volatile at this temperature range, and can poison the interface of electrochemical devices, leading to an increased polarization. Furthermore, the chromia scale may also create problems in device operation as a result of its chemical stability. Chromia scale can react with barium-calcium-aluminosilicate based sealing glasses, used in SOFC stacks, to form a high thermal expansion mismatch barium chromate compound, resulting in further performance deterioration of metal-metal and metal-ceramic seals.

Based on the problems and issues with interconnects and joins discussed above there remains a need for improved interconnects and improved methods for interconnecting components.

BRIEF SUMMARY OF THE INVENTION

Accordingly, it is an object of the present invention to provide an improved interconnection between metal and ceramic parts. It should be understood that these improved interconnections, and the method for making these improved interconnections, may be between two metal parts, or a metal part and a ceramic part, and the phrase "between metal and ceramic parts" should be understood to include both of these possibilities. It should further be understood that while these improved interconnections, and the method for making these improved interconnections, is particularly advantageous in the fabrication of electrochemical devices, the invention is broadly applicable to any application wherein two metal parts are bonded together, or any application wherein a metal part and a ceramic part are bonded together.

It is a further object of the present invention to provide an improved interconnection between metal and ceramic parts used in electrochemical devices, including without limitation oxygen generators and fuel cells, such as solid oxide fuel cells.

It is a further object of the invention to provide a method for fabricating interconnections between metal and ceramic parts.

It is a further object of the invention to provide a method for fabricating interconnections between metal and ceramic parts used in electrochemical devices, such as oxygen generators and solid oxide fuel cells, having increased bonding strength.

It is a further object of the present invention to provide improved interconnections between metal and ceramic parts wherein a bond coat is formed on the surface of a first metal part, and a sealing material is then applied to the first metal part, prior to joining it with another metal or ceramic part.

It is a further object of the present invention to provide improved interconnections between metal and ceramic parts wherein a bond coat of MAl (M=Fe, Ni, Co) or MCrAlY (M=Fe, Ni, Co) is formed on the surface of a first metal part consisting of a chromia forming ferritic stainless steel, and a sealing material of glass or braze is then applied to the first metal part prior to joining it with another metal or ceramic part.

It is a further object of the present invention to provide improved interconnections between metal and ceramic parts wherein a bond coat is formed by heating a first metal part consisting of an Al containing alloy, including but not limited to ferritic stainless steels, austinetic stainless steels, and superalloys, under reducing conditions for a time sufficient to form a cauliflower growths of aluminum oxide nodules on the surface of the part, and then applying a sealing material of glass or braze to the first metal part prior to joining it with another metal or ceramic part.

These and other objects of the present invention are accomplished by modifying the surface of a first metal part to form a bond coat so that sealing materials such as a glass ceramic or braze can be applied to the bond coat. It has been discovered that this approach substantially improves the adhesion of the metal part to a sealing material of glass or braze, and in turn, to another metal or ceramic part. It has also been shown that this approach significantly increases the surface stability of the interconnect region as well. The method is practiced by first modifying the surface of a first metal part to form the bond coat. In modifying the surface of the first metal part, the preferred approach is dependant upon the characteristics of the metal part, where two possibilities exist; chromia forming alloys and alumina forming alloys. In the case of chromia forming alloys, the first metal part is selected as ferritic stainless steel.

In the case of ferretic stainless steel, the bond coat is formed either by the application of a diffusion coat of the form MAl (M=Fe, Ni, Co) or an overlay coat of the form MCrAlY (M=Fe, Ni, Co). The designation of M depends on the composition of the heat resistant alloy, preferably M is the element that forms the base of the alloy. For example, in ferritic stainless steels, FeAl and FeCrAlY are preferred for the diffusion bond coat and overlay bond coat, respectively.

The MAl coat can be applied using a diffusion coating process such as a slurry spray diffusion process, followed by heating. Such application processes are well understood by those having skill in the art, and further elaboration of these processes is not necessary for an understanding of the present invention. During the processing, a diffusion layer is formed within the first metal part, and thus a metallurgical bond is built between the MAl coat and the first metal part. The MCrAlY overlay coat can be applied through a PVD or plasma spray process, such as the electro-spark deposition and vacuum plasma spray. Such processes are also well understood by those having skill in the art, and further elaboration of these processes is also not necessary for an understanding of the present invention. A moderate diffusion layer is formed at the surface of the part during the subsequent heat treatment, and a metallurgical bond is established as well. Using either method, a thin alumina layer (the bond coat) is thermally grown on the surface of the first metal part, with a diffusion layer between the alumina layer and the first metal part. It is preferred that the microstructure, phase constitution and thickness of the diffusion layer on the first metal part be optimized according to the sealing materials and SOFC stack design, so as to minimize the residual thermo-stress and thus improve the thermomechanical durability of meta/metal and metal/ceramic seals.

In the case of alumina forming alloys, a broader range of materials may be utilized when practicing the present invention than as compared to chromia forming alloys. For alumina forming alloys, preferred materials include, but are not limited to ferritic stainless steels, austinetic stainless steels, and superalloys. Bond coats are formed on alumina forming alloys by making use of the alumina present in the alloys. Briefly, the bond coat of the present invention is formed on these materials by heating them for a sufficient time and temperature in a reducing environment to form cauliflower-like growths of an aluminum oxide nodules.

As an example, and not meant to be limiting, a Fecralloy is a suitable alumina forming alloy, as it is typical that commercially available Fecralloys will contain approximately 5% aluminum. For example, a Fecralloy having 22% Cr, 4.5% Al, 0.1% Y is commercially available from Goodfellow. A bond coat consisting of a cauliflower-like growth of an aluminum oxide nodule can be formed on the surface of the Fecralloy simply by heating the Fecralloy for a sufficient time and temperature in a reducing environment.

As described in the detailed description of this specification, these cauliflower-like growths are particularly effective at forming the desired bond between the first metallic part and braze or glass sealing materials.

Whatever first metal part is selected, the goal is to modify the surface of the part so that it will effectively bond to the sealing material without degrading under the operating conditions of electrochemical devices. In the case of chromia forming alloys, the surface of the metal part is modified by application of a bond coat with a thin layer of alumina insitu formed on the surface, while for alumina forming alloys, such as the Fecralloys, the surface of the metal part in modified by forming cauliflower-like nodules, which are embedded in the surface of the alloy. The bond coat provides a good bonding surface for a glass or braze layer, which is to follow, while at the same time the diffusion layer provides a durable bond between the thin alumina layer and the first metal part.

Suitable brazes for the present invention include all of those described in the Provisional U.S. patent application Ser. No. 60/348,688, entitled "Oxidation Ceramic-to-Metal Braze", filed Jan. 11, 2002 by Weil et al. and assigned to the same assignee as the present application, the entire contents of which are hereby incorporated by this reference. Preferred among the brazes described therein are those of a Cu—Ag alloy.

Suitable sealing glasses for the present invention include those described in copending U.S. patent application Ser. No. 09/365,343 entitled "Glass Ceramic Material And Method Of Making" filed Jul. 30, 1999 now U.S. Pat. No. 6,430,966 and copending U.S. patent application Ser. No. 09/562,583-"Glass-Ceramic Joint And Method Of Joining" filed May 1, 2000 now U.S. Pat. No. 6,532,769, the entire contents of each of which are hereby incorporated in their entirety by this reference. As described in these references, those glasses include glasses consisting of at least three metal oxides of M1-M2-M3 wherein M1 is selected from the group consisting of BaO, SrO, CaO, MgO, and combinations thereof and wherein M1 is present in an amount from about 20 mol % to about 55 mol %, M2 is $Al_2O_3$ and wherein M2 is present in an amount from 2 to 15 mol %, and M3 is $SiO_2$ with at least some $B_2O_3$ and up to 50 mol % of $B_2O_3$ and wherein M3 is present in an amount from about 40 mol % to about 70 mol %. Particularly preferred were glasses described as sample 18 in the latter reference.

In the case of the chromia forming alloys, to have a stronger bond strength between the bond coat and the glass or braze layer, it is preferred to select and/or control the coating process so as to yield a bond coat surface with some roughness. During sealing, the glass or braze sealing materials penetrate the coating surface through cavities to form mechanical interlocks, leading to improved interfacial bonding strength. The rough bond surface is believed to be one of the major mechanisms for improved bonding strength in meta-metal or metal-ceramics seals using sealing materials such as glass ceramic or metal braze.

With both Fercalloys and ferritic stainless steels, the sealing interfacial strength can be further improved by incorporating reactive elements such as Y and other rare earth elements into the bond coats. During oxidation, these reactive elements form oxides, which form "pegs" through the grain boundaries. Thus, addition of the reactive elements helps improve the oxide scale adherence and ultimately increases seal bonding strength.

These thermally grown aluminas not only possesses a better adherence than chromia scale, but also provide a much needed, and substantially improved, oxidation resistance, and prevent the formation of oxide scale from evaporation in any area that is free of sealing and exposed in the operation environment of electrochemical devices.

In the case where the chromia forming alloy is used to make the first part, the method of the present invention also offers the flexibility to apply coatings only on interconnects or mask areas which will be joined with current collectors, or in electrical contact with electrodes, and to leave the coated area for electrical connections. Thus the power output can be maximized through minimizing the contact resistance at interfaces with interconnects.

An additional layer of yttria stabilized zirconia (YSZ) or a composite containing the bond coat composition and YSZ or other metal oxides, including but not limited to $\alpha$-$Al_2O_3$ may also be employed as an insulator between metal to metal interconnections. In the case of metal to metal interconnections that utilize a braze, such a layer helps insulate the electrical connectivity of the two parts. In the case of metal to metal interconnections that do not utilize a braze, such a layer is optional for its insulating effect, but may be preferred to improve the stress distribution between the parts. In the case of metal to ceramic interconnections, such a layer is unnecessary. This additional layer should not be confused with YSZ layers contained within the SOFC stack.

Thus, a ceramic top coat can also be applied over the modified surface of the first metal part. Suitable topcoats include YSZ, a composite containing the bond coating composition and YSZ, or metal oxides, including but not limited to $\alpha$-$Al_2O_3$. With appropriate selection of the second part composition and coating process, the top coat can offer a lower bond stress and more symmetrical stress distribution at metal-ceramic sealing interface, which thus leads to an improved durability, especially under thermal cycling. A ceramic topcoat may be preferred, as second metal parts are made from heat resistant alloys, due to the fact that a ceramic top coat such as YSZ will act as an insulating interface to completely block the electrical path and thus help improve the performance of the seal in electrochemical devices including, but not limited to, solid oxide fuel cells and oxygen generators.

The final step in the process is the adhesion of a second metal or ceramic part over the sealing materials. In the case of a heat resistant alloy, such as a chromia or alumina forming alloy, it is preferred that second metal part be treated to form a bond coat in the same manner as described above for the first metal parts.

BRIEF DESCRIPTION OF THE SEVERAL VIEWS OF THE DRAWING

FIG. 2(a) is the SEM image of meta-metal glass sealing interface; and FIG. 2(b) Enlarged microstructure of area A in (a).

DETAILED DESCRIPTION OF THE INVENTION

A series of experiments were conducted in accordance with the methods of the present invention. While these experiments are useful to demonstrate certain features and aspects of the present invention, they should in no way be interpreted as an exhaustive demonstration of all of the various aspects of the invention. As will be recognized by those having skill in the art, many of the advantages of the present invention can readily be achieved with significant variations from the experiments described herein, including, without limitation, the selection of the materials, and the methods and operating parameters used to combine those materials. Accordingly, the present invention should be broadly construed to include all such modifications and equivalents thereto that are encompassed by the appended claims.

Figure 1:
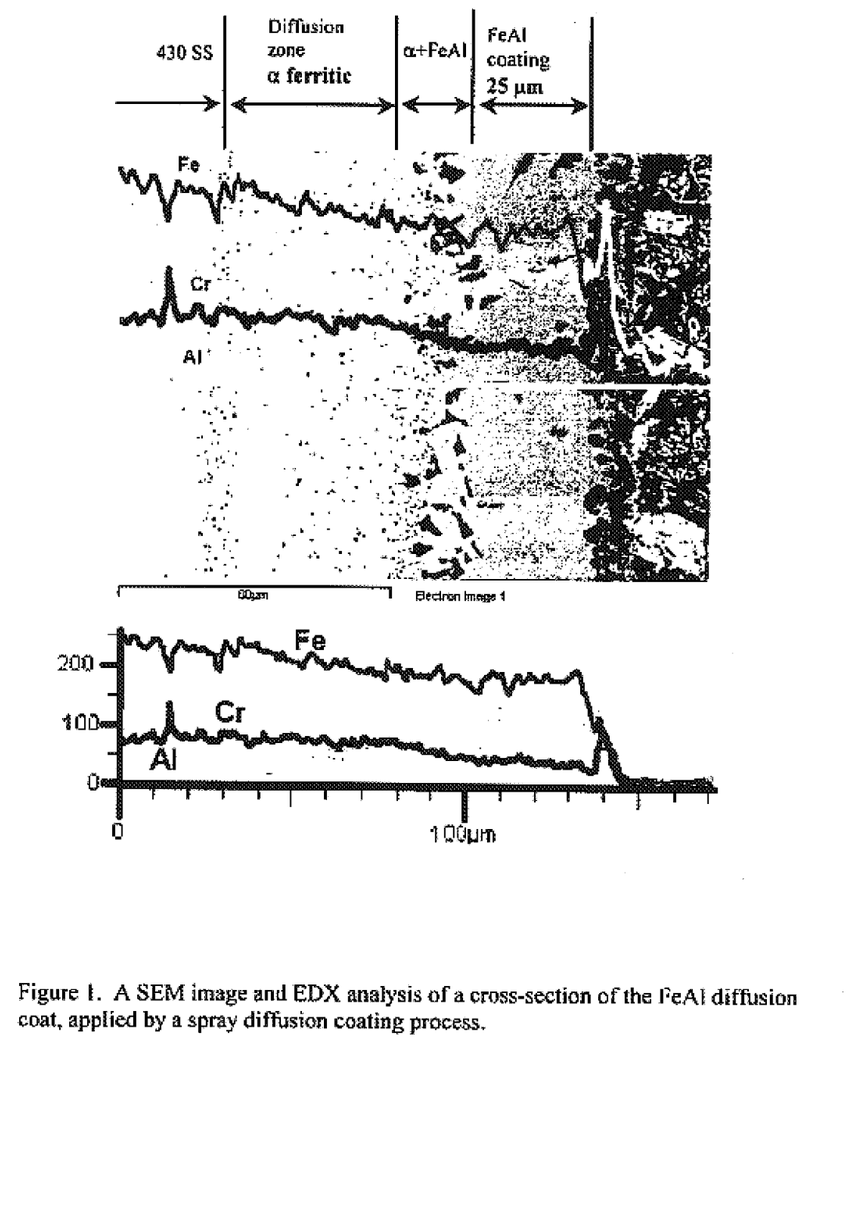
FIG. 1 is an SEM image and EDX analysis of a cross-section of a bond coating of a FeAl diffusion layer formed by a slurry spray diffusion coating process using ferritic steel according to one aspect of the present invention.
Figure 2:
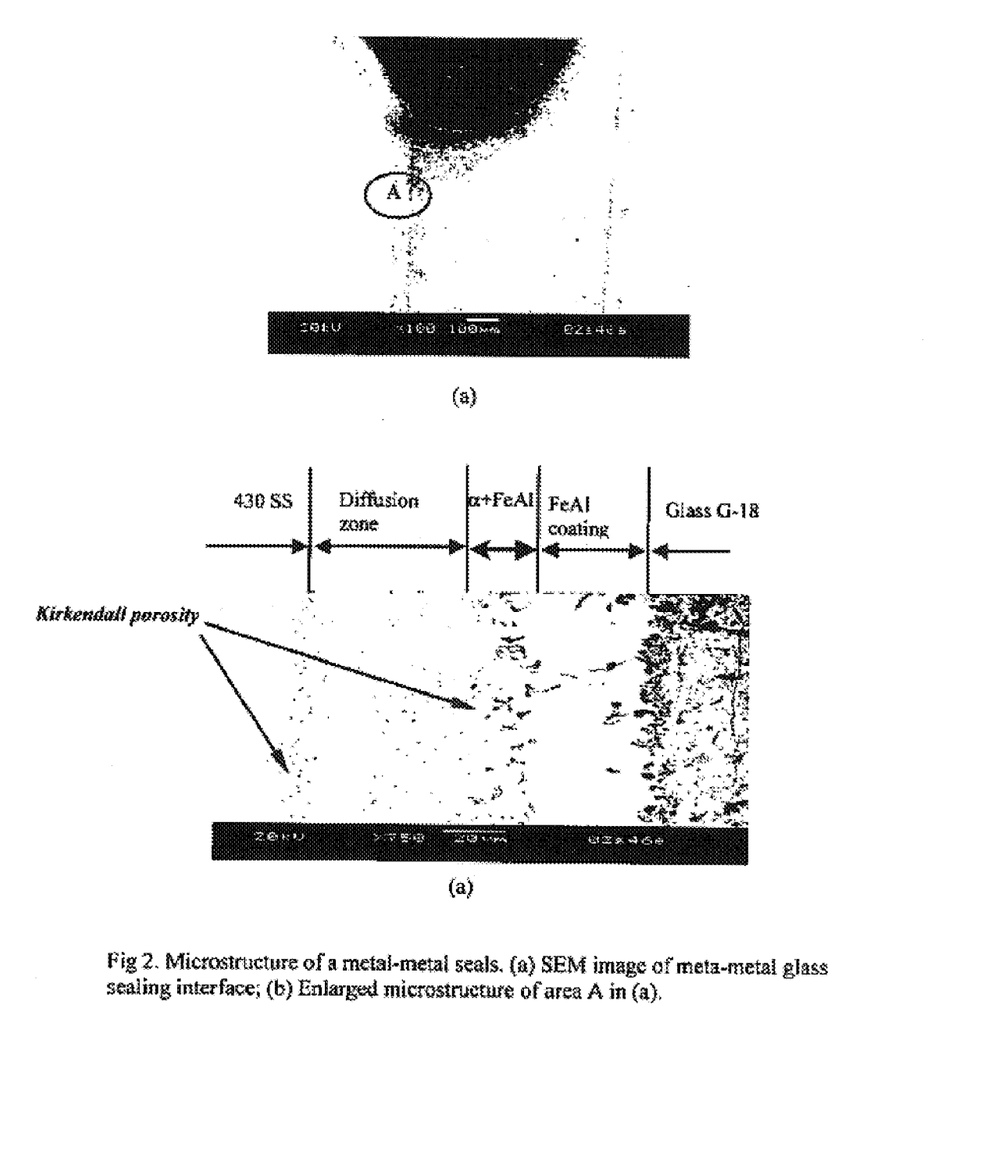
FIG. 2. is an SEM image of the microstructure of the metal-metal seals.

A first set of experiments was conducted to demonstrate the features of the invention associated with bond coats formed with chromia forming ferritic stainless steels. Ferritic stainless steel 430 plates 20 mils thick were selected as the matrix composition to make the interconnect components as would be typical in a solid oxide fuel cell. These include separator plate, spacer and a frame. A 430 plate was aluminized or coated using PWA 44, a slurry diffusion coating process typically used to aluminize high temperature service parts made from austenitic heat resistant alloys, including austenitic stainless steels and Fe-, Ni- and Co-base-superalloys. The process begins by spraying the Al containing slurry (Al or Al alloy powders, binder and solvent) onto the 430 plate. The spray-coated 430 plate is then subjected to heat-treating at a temperature in 900~1,000° C. under non-oxidizing or vacuum environments for a couple of hours. Shown in FIG. 1 is the microstructure of a cross-section from a coated 430 plate. Heat-treating at about 1,000° C. in argon atmosphere for 4 hours was employed during the slurry diffusion coating. SEM image and energy dispersive X-ray analysis indicate that a 25~30 $\mu$m FeAl layer with about 40 atomic % Al was generated after diffusion coating. Beneath the FeAl layer, a ~50 $\mu$m thick diffusion zone was formed by inward diffusion of Al during high temperature heat-treating. Al concentrations were shown to decrease from about 20 atomic % at the boundary of the adjacent FeAl layer to almost zero at the end of the diffusion zone. The coating surface thus formed was rough and full of cavities. The diffusion voids, also called Kirkendall porosity, can be clearly seen in the more detailed cross-section shown in FIG. 2.

Detailed analysis of the samples revealed that a thin $Al_2O_3$ scale, thermally grown during diffusion coating, covers the coating surface (FeAl layer) and provides an excellent oxidation resistance that is orders of magnitude higher than uncoated SS430. The growth of $Al_2O_3$ scale, in favor of chromia scale, on uncoated 430 significantly improved the surface stability. The dense, thin $Al_2O_3$ scale formation also prevents the evaporation of chromia oxide species under SOFC operation environments. The $Al_2O_3$ scale also modifies the chemical compatibility with the sealing materials, described as follows.

To evaluate chemical compatibility of the coating with sealing glass, two-coated 430 plates were joined together with the sealing glass, a calcium-barium-aluminosilicate base glass described in greater detail as sample 18 in copending U.S. patent application Ser. No. 09/562,583- "Glass-Ceramic Joint And Method Of Joining" filed May 1, 2000 now U.S. Pat. No. 6,532,769. For simplicity, as used herein in the remainder of this specification, this particular glass is referred to simply as "18".

Figure 4:
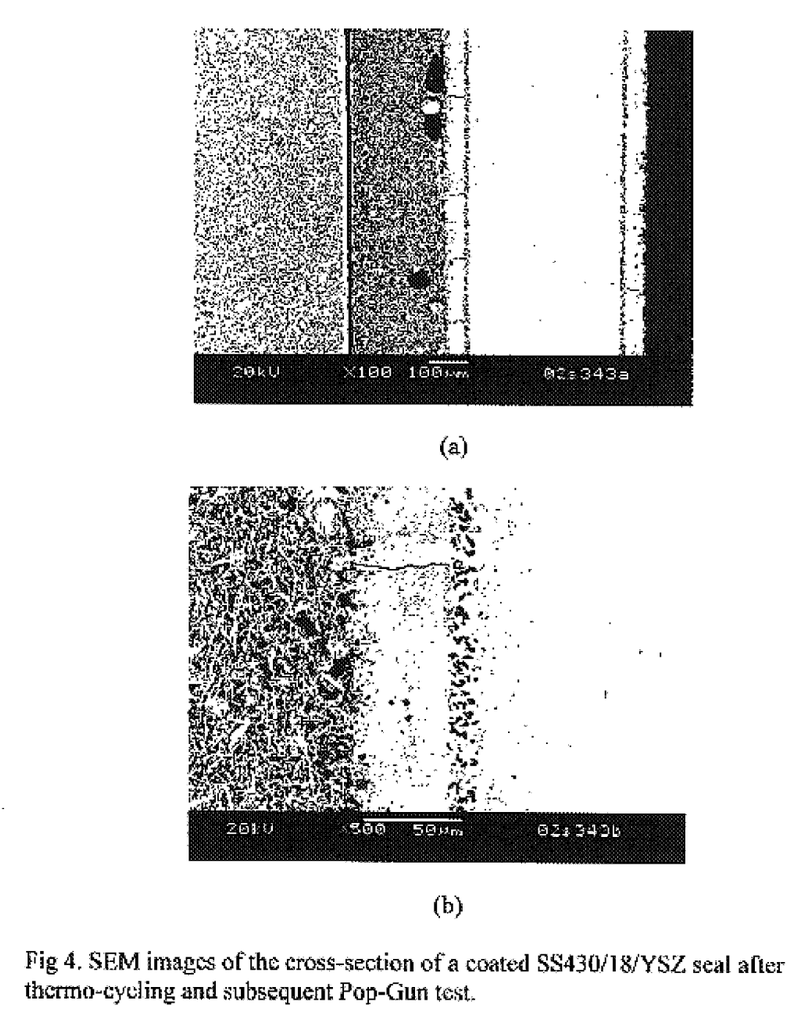
FIG. 4. is SEM images of the cross-section of a coated SS430/18/YSZ seal after thermo-cycling and a subsequent Pop-Gun test.

Joining was carried out in an air furnace by heating to 850° C. for one hour, followed by heating at 750° C. 4 hours, with a heating and cooling rate at 5° C./min. The microstructure of the cross-section of this joint is shown in FIG. 4. As shown in the cross section, the glass-sealing interface appears free from cracks. The concave portion at the top of the joint (refer FIG. 4(a)) implies that the sealing glass is wetting well with the coating surface. Unlike uncoated 430 plates, where chromia scale is volatile and extensively reacted with calcium-barium-alumino-silicate glass to form high thermal expansion mismatch product $BaCrO_4$, little chemical interaction or harmful chemical species were formed at the interface after coating. An enlarged image, shown in FIG. 4(b), also indicates that the glass is penetrating the cavities at the coating surface, thus further assisting bonding through mechanical interlocking.

The seals thus fabricated were then subjected to a Pop-Gun test, an engineering test which uses pressurized gas to determine the seal bond strength. The samples were prepared by glass or braze joining the coated 430 circular coupons to YSZ electrolyte on PEN. Two different sets of parameters were investigated during the coating process. At the early stage, a temperature of about 1,000° C. was used for heating, and a 1.0 mil to 3.0 mil coating thickness was designated. The heating temperature was then decreased to about 900° C. and the thickness from about 0.5 to about 1.0 mil was investigated. The glass again was sample 18, a calcium-barium-aluminosilicate base glass, and the braze material was the Ag-base, low temperature, oxidation resistance braze described in Provisional U.S. patent application Ser. No. 60/348,680, entitled "Oxidation Ceramic-to-Metal Braze", filed Jan. 11, 2002 by Weil et al.

The joining was carried out in an air furnace at 850° C. for 1 hour, and then followed by 750° C. for 4 hours. For evaluation of thermomechanical properties, several batches of joined samples were subsequently subject to three thermal cycles from room temperature to 750° C. and then to room temperature at heat/cooling rate of 10° C./min. At each point, a number of samples were tested and the final results were averaged statistically. The data is outlined in FIG. 3, from which the following conclusions can be drawn:

The seal bonding strength of coated FSS430/18/YSZ seal (Series D) is 2~3 times higher than that of unaluminized 430/18/YSZ seal (Series A). As the Ag-base braze was used as the sealing materials, the bonding strength of FSS430/braze/YSZ (Series K) seal improves 3~4 times over that of uncoated FSS430/18/YSZ. It is noted that A, D, and K series of samples were coated at about 1,000° C. with 1 mil thickness.

As the heating temperature was decreased to 9,00° C. and the coating thickness was thinned to half mil, the bonding strength of coated SS430/18/YSZ seal was further improved and increased to around 60 PSI (Series O), i.e. 2~3 times of the one treated at 1,000° C.

After three thermo-cycles, the seals of coated SS430/18/YSZ (heat-treated at 900° C. and with half mil thickness) (Series L and Q) still demonstrated a decent bonding strength at about 47.0 PSI, compared to uncoated 430/18/YSZ at 10 PSI (Series A). When the Ag-base braze was used as the sealing materials, the seal bonding strength (Refer Series K and L) was not significantly affected after cycling.

It was also found that when SS 430 was heat treated at 900° C. during diffusion coating and the thickness was decreased to half mil, seals after thermal cycling failed during Pop-Gun tests in a way that the cracks initiated and propagated along the interface between the sealing glass and YSZ on the ceramic cell components, as shown in FIG. 4(a). In contrast, on the side of metal component, the coating was still chemically and mechanically stable, and strongly bonded with the sealing glass through mechanical interlocking, as shown in FIG. 4(b).

Overall, it can be concluded that after surface modification of ferritic stainless steel 430 according to the method of the present invention, the seal bonding strength is substantially improved over the unmodified steel.

Figure 7:
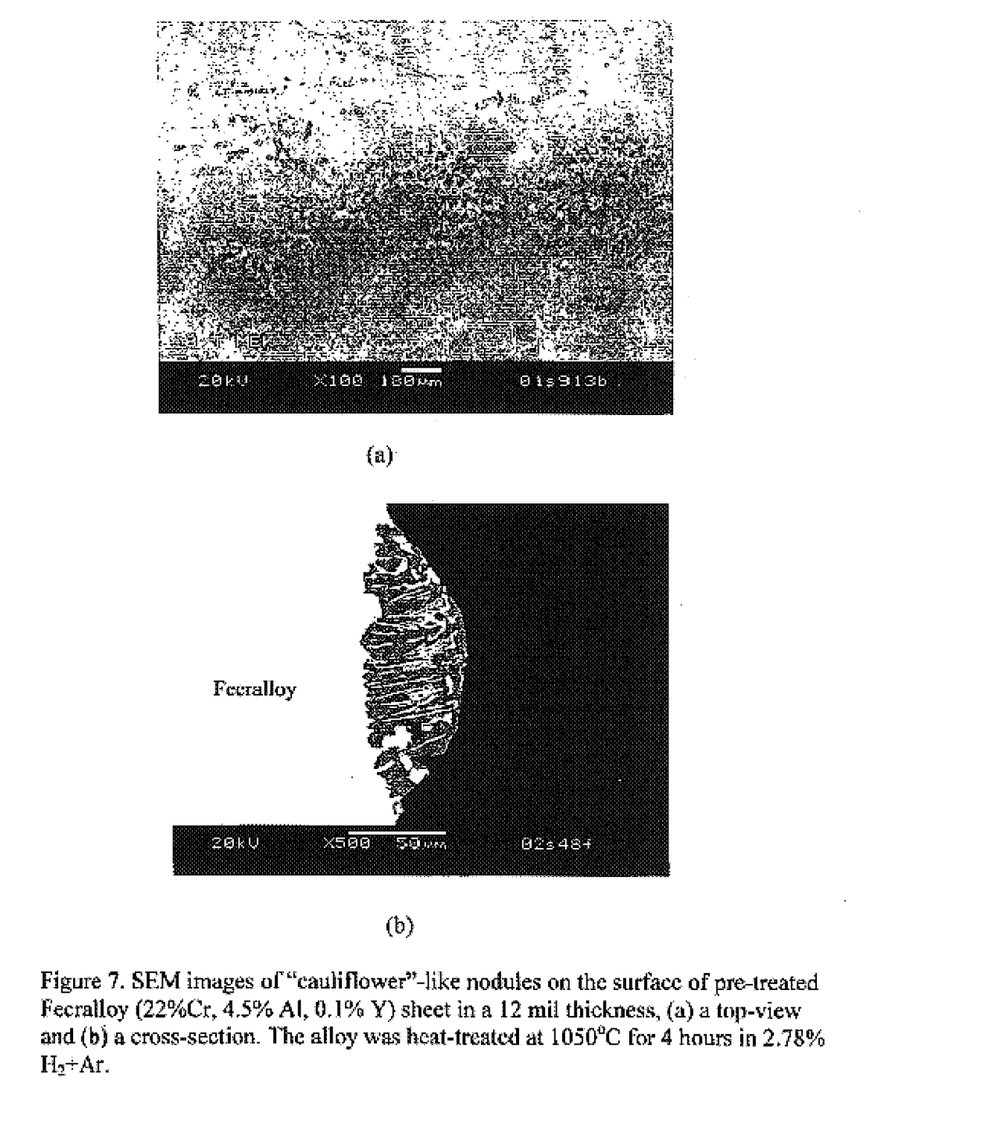
FIG. 7 is SEM images of "cauliflower"-like nodules on the surface of pre-treated Fecralloy (22%Cr, 4.5% Al, 0.1% Y) sheet in a 12 mil thickness, (a) a top-view and (b) a cross-section. The alloy was heat-treated at 1050° C. for 4 hours in 2.78% $H_2$+Ar.

The present invention was then applied to fabricate interconnects and seal structures in planar SOFC stacks. In these experiments, interconnect components included a separator plate, a window frame, and anode and cathode side spacers. The separator plate separates the anode in the fuel side and cathode in the air or oxidant side, and the cells were electrically connected in series. The window frame provides mechanical support to PEN (positive cathode-YSZ electrolyte-negative anode). The anode and cathode side spacers leave space for current collector and help maintain stack's mechanical integrity. The spacers, frame and separator were all made from stainless steel 430, which is cheaper and offers a better thermal expansion match than many other commercial ferritic compositions. The frame was hermetically sealed to PEN and also to anode and cathode side spacers. The spacers were sealed to separator plates as well. One approach joined the spacers with the frame using high temperature braze such as BNi-2 at high temperature in vacuum. The high temperature brazed assembly was then aluminized using a slurry spray coating. During coating, the separator plate could be masked in areas where a current collector would be joined later, providing a further advantage of the present invention. After diffusion coating, the coated assembly was subsequently glass or braze-sealed in air to the YSZ layer on the PEN. The assembly thus fabricated, as shown in FIG. 7, was strongly glass-bonded to PEN or ceramic cells after heating in air to 850° C., followed by 750° C. for 4 hours. With appropriate control in processing, the fabricated assembly demonstrated satisfactory dimensional stability for use in commercial applications. In contrast, the unaluminized 430 frames could barely be bonded to PEN, which usually ended up with the separation between the PEN and frame after sealing. The interconnect and cell assemblies thusly fabricated were then stacked together with glass sealing separator plates and spacers along the fringes.

The hermeticity of seals fabricated was measured using an in-house Thermal Cycling Leak Detector (TCLD). The leak tests were done on the assembly made by glass sealing the component to a separator plate, which was aluminized as well before sealing. The tested assembly, which is the same unit as in the SOFC stack, contains two glass seals: one was the coated FSS 430/18/YSZ, and the other one was the coated FSS430 (spacer)/18/coated FSS430 (separator).

Figure 5:
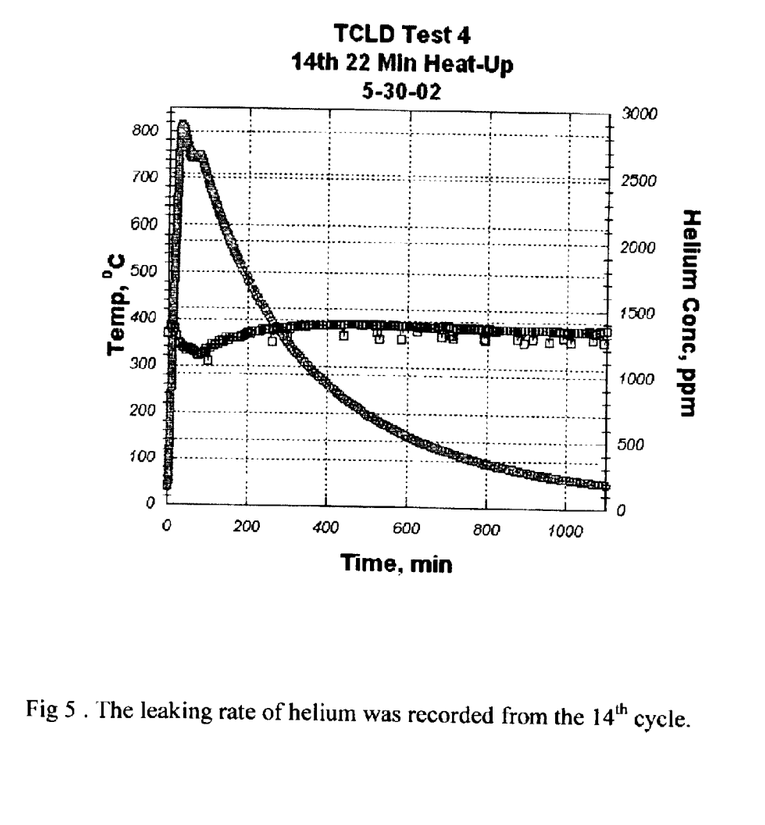
FIG. 5. is a graph showing the leaking rate of helium through a sample seal fabricated according to the present invention. The leaking rate was recorded from the $14^{th}$ cycle.

After setting up the test stand, the test started with fast heating to 750° C. in 22 minutes, followed by furnace cooling to room temperature, while the leaking rate of helium that was pressurized into the anode side of the tested unit was monitored at the cathode or air side. The thermal cycling was achieved by simply repeating the fast heating and furnace-cooling. As an example, the leak rate of helium from the $14^{th}$ cycle was recorded and shown in FIG. 5.

Figure 6:
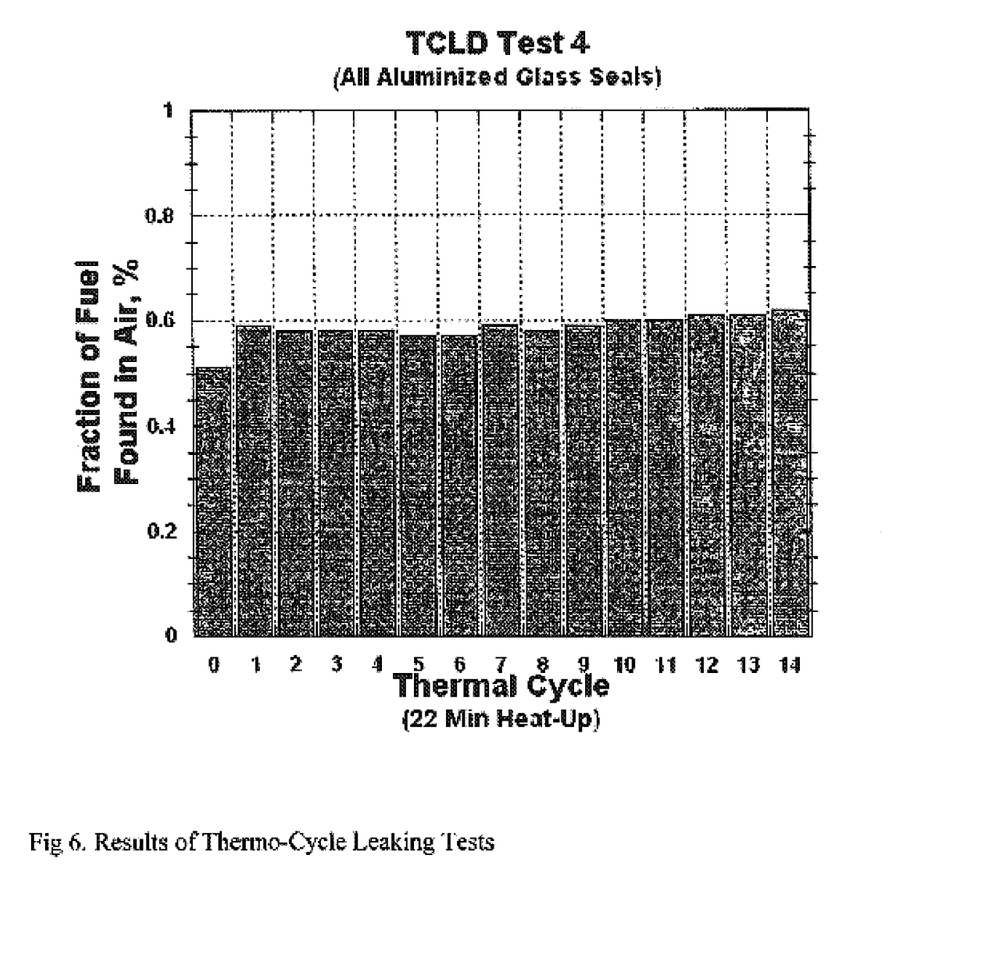
FIG. 6. is a graph showing the results of thermo-cycle leaking tests of a sample seal fabricated according to the present invention.

To help interpret the data, the leaking rate was converted to a percentage of the total of input helium. The percentage as a function of cycling is given in FIG. 6.

Before heating and cycling, the leaking rate was very low at little above 0.5% (equivalent to 0.5% power drop by assuming the fuel can be fully used or burned). After first cycling, this leaking percentage was slightly increased to close to 0.6%. This leaking percentage was kept as constant and changed little during the subsequent heating and cooling till to the $14^{th}$ cycles. Therefore, the seals, either in metal/glass/metal or metal/glass/YSZ, fabricated according to the present invention offer exceptional performance.

A second set of experiments was conducted to demonstrate the features of the invention associated with bond coats formed by heating Fercalloy under reducing conditions for a time sufficient to form a cauliflower growth of aluminum oxide nodules. Fecralloy having 22% Cr, 4.5% Al, 0.1% Y was obtained from Goodfellow. Pieces of ¾"×¾" cold-rolled thin sheet samples in a 2 mil thickness were heat-treated at 1050° C. for 4 hours in 2.78% $H_2$+Ar atmosphere (pre-purified). The heat treatment was conducted in a graphite-sintering furnace (Thermal Technology Inc.) with a heating rate at 15° C. per minute and a cooling rate of 5° C. per minute. After heat treatment, the nodules became visible on the thin sheet sample surface and could be felt by hand. SEM investigation revealed that separate nodules grew with a shape similar to cauliflowers on the alloy surface, as shown in FIG. 7(*a*).

An energy dispersive X-ray analysis on the individual nodules indicated that an oxide layer, mainly comprised of $Al_2O_3$, and occasionally small amounts of $Cr_2O_3$ and iron oxides, covered the rough surface of nodules. A cross-section of the pre-treated Fecralloy sheet as shown in FIG. 7(*b*) shows that the nodules pegs in the alloy matrix, connecting through metallic ridges. An X-ray analysis on the adjacent area of the nodule indicated that little or no depletion of Al in the alloy matrix. Thus the growth of these cauliflower-like nodules is not expected to cause the degradation of the excellent oxidation resistance typical of Fecralloys. The same heat treatment was also used to reproduce cauliflower-like nodules on sheet samples in a 12 mil thickness, as well as other size and shapes, including the frames (3¾"×4¼") of a sample SOFC stack.

The aforementioned processing was then optimized through a systematic investigation on effects of parameters, including atmosphere, temperature and time. Among studied atmospheres, including He, Ar and 2.78% $H_2$+Ar, it appears that an atmosphere of approximately 2.78% $H_2$+Ar is particularly effective for the formation of cauliflower-like nodules. Temperatures of approximately 1050° C. were also observed as being particularly conductive towards the growth of cauliflower like nodules having a homogeneous growth, and without causing any undesired chemical and structural changes in the matrix. At the temperatures lower than about 1000° C., the nodules were observed to grow with lesser frequency, and to be less homogeneously distributed, while over 1100° C. the intermetallic phases were observed as being more likely to form, potentially leading to a more brittle substrate. The duration of heating appeared less sensitive than these other two factors, but at least 4 hours of heating appeared to enhance the homogeneity of the resultant growth.

The chemical compatibility of the interface with a sealing glass, again that described as sample 18 in copending U.S. patent application No. 09/562,583-"Glass-Ceramic Joint And Method Of Joining" filed May 1, 2000 now U.S. Pat. No. 6,532,769, was also investigated. FIG. 7 shows the resulting interface of a pre-treated Fecralloy/G-18/pre-treated Fecralloy seal. No corrosion or extensive reactions were found at the interface of sealing glass and pre-treated Fecralloy, as shown in FIGS. 7(*a*) and (*b*). The cross-section of the seal clearly shows that the "cauliflower" nodules bridge the alloy matrix and the sealing glass, leading to a stronger bond of the sealing glass to the alloy matrix.

Figure 8:
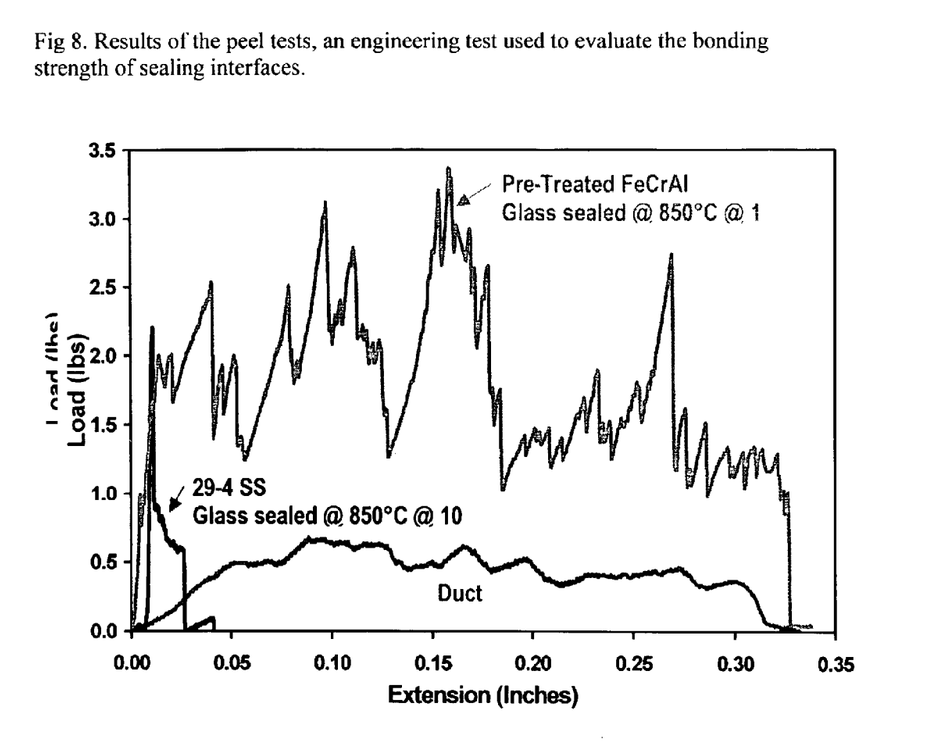
FIG. 8. is a graph showing the results of the peel tests, an engineering test used to evaluate the bonding strength of sealing interfaces, performed on samples of Fercalloy used to demonstrate an aspect of the present invention.
Figure 9:
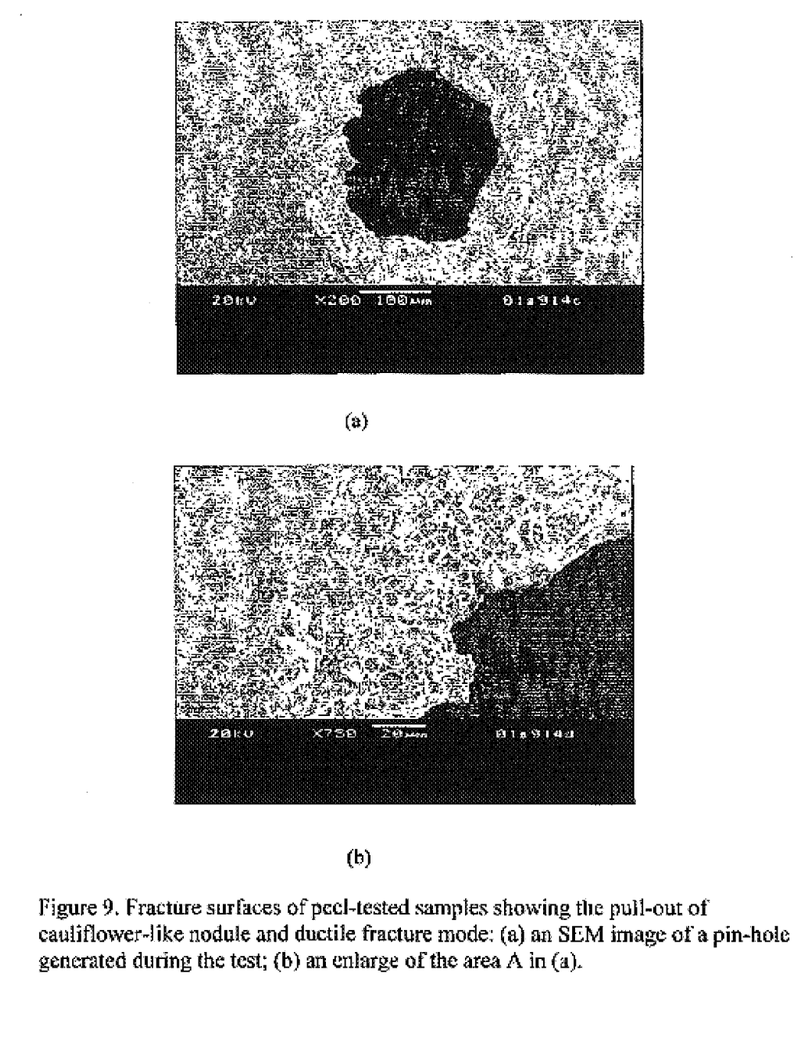
FIG. 9. shows fracture surfaces of peel-tested samples showing the pull-out of cauliflower like nodule and ductile fracture mode: (a) and SEM image of a pin hole generated during the test (b) and enlarged view of the area A shown in (a).

A peel-test, a modification of ASTM D 1876, was selected to evaluate the interfacial (peel) strength of the joint of YSZ (an electrolyte in SOFCs) with the glass and the alloy stripe. The results from the test on the pre-treated Fecralloy strip in a 2 mil thickness are shown in FIG. 8 along with those for ferritic stainless steel strips having 29 weight % chrome and 4 weight % Mo ("29-4") of the same thickness, as well as duct tape, for comparison. As shown in these results, it appears that the joint with pre-treated Fecralloy not only possesses a higher peak peel strength than that with 29-4, but also that the failure modes are quite different. The joint with a 29-4 strip typically broke in a catastrophic mode and failed quickly. In comparison, the pre-treated Fecralloy strip was peeled gradually (similar to the duct tape) and thus significantly higher energy (represented by the area under the load-extension curve) was consumed before it was completely peeled off. The microscopic analysis on the fracture surface confirms that the pre-treated Fecralloy strip was peeled off by pulling out the "cauliflower"-like nodules in the alloy matrix, and pinholes were left on the alloy shin strip, as shown in FIG. 9(*a*). A closer examination of the fracture surface, as seen in FIG. 9(*b*), furthers reveals that the joint with the pre-treated alloy failed in a ductile mode through breaking the metallic ridges in the nodules and/or tearing the alloy matrix.

Figure 3:
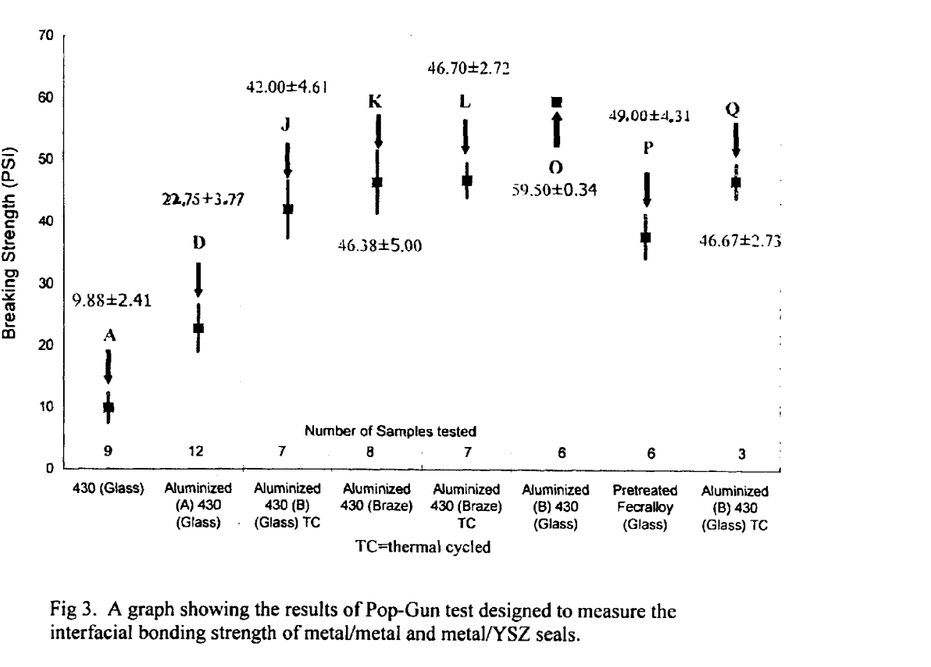
FIG. 3. is a graph showing the results of Pop-Gun test designed to measure the interfacial bonding strength of metal/metal and metal/YSZ seals fabricated according to one aspect of the present invention. The metal parts are made from ferritic stainless steel 430 or a Fecralloy, and modified through a bond coating of a FeAl diffusion layer by a spray diffusion coating process and growth of cauliflower like nodules by heat treating in a reducing atmosphere.

Another engineering test, the pop-gun test, was conducted to further demonstrate that growth of "cauliflower"-like nodules on a Fecralloy surface substantially improves the bonding in seals of pre-treated Fecralloy bonded with glass to YSZ. The results are shown in FIG. 3 as series K, together with bare 430 and seals modified through bond coatings made by slurry spray diffusion coatings. From the figure, it appears that the interfacial strength of the seal, in which the modified or pre-treated Fecralloy was used to make the first metal part is five times higher than bare 430, which is believed to be close to that of untreated Fecralloy. In this series of tests, it was observed that several seals with pre-treated Fecralloy even could not even be broken by the current pop-gun tests in which the pressure was limited under 60 PSI. Accordingly, it is certain that the actual interfacial strength of the seal with modified or pre-treated Fecralloy is higher that the value shown.

CLOSURE

While a preferred embodiment of the present invention has been shown and described, it will be apparent to those skilled in the art that many changes and modifications may be made without departing from the invention in its broader aspects. For example, a wide range of metals, glasses, brazes and ceramics could be employed, together with a wide variety of methods for forming such materials into layers upon one and another. The appended claims are therefore intended to cover all such changes and modifications as fall within the true spirit and scope of the invention.

We claim:

1. A method of manufacturing metal-to-metal and metal-to-ceramic interconnections comprising the steps of:
    a) forming a bond coat on a first metal part,
    b) applying a glass sealing matferial selected as consisting of at least three metal oxides of M1-M2-M3 wherein M1 is selected from the group consisting of BaO, SrO, CaO, MgO, and combinations thereof and wherein M1 is present in an amount from about 20 mol % to about 55 mol %, M2 is $Al_2O_3$ and wherein M2 is present in an amount from 2 to 15 mol %, and M3 is $SiO_2$ with at least some $B_2O_3$ and up to 50 mol % of $B_2O_3$ and wherein M3 is present in an amount from about 40 mol % to about 70 mol % to said bond coat, and
    c) adhering a second part to said sealing material.

2. A method of manufacturing metal-to-metal and metal-to-ceramic interconnections comprising the steps of:
    a) forming a bond coat on a first metal part, said first metal part selected as a chromia forming alloy of ferritic stainless steel by the application of a diffusion coat of the form MAl (M=Fe, Ni, Co) followed by heating and the application of an overlay coat of the form MCrAlY (M=Fe, Ni, Co) followed by heating
    b) applying a sealing material to said bond coat, and
    c) adhering a second part to said sealing material.

3. The method of claim 2 wherein M is selected to correspond with the predominant metal present in said first metal part.

4. The method of claim 2 wherein said second part is selected from the group consisting of metal and ceramic parts.

5. The method of claim 2 wherein said sealing material is selected from the group consisting of glasses, brazes and combinations thereof.

6. The method of claim 5 wherein said brazes are selected as an Ag—Cu alloy.

7. A method of manufacturing metal-to-metal and metal-to-ceramic interconnections comprising the steps of:
    a) forming a bond coat on a first metal part, said first metal part selected as an alumina forming alloy from the group consisting of ferritic stainless steel, austinetic stainless steel, and super alloy, said bond coat formed by heating said alumina forming alloy under reducing conditions for a time sufficient to form a cauliflower-like growth of an aluminum oxide nodule,
    b) applying a sealing material to said bond coat, and
    c) adhering a second part to said sealing material.

8. The method of claim 7 wherein said second part is selected from the group consisting of metal and ceramic parts.

9. The method of claim 7 wherein said sealing material is selected from the group consisting of glasses, brazes and combinations thereof.

10. The method of claim 9 wherein said brazes are selected as an Ag—Cu alloy.

11. The method of claim 7 wherein said ferritic stainless steel is selected as Fecralloy.

* * * * *